(12) United States Patent
Roy et al.

(10) Patent No.: US 12,127,253 B2
(45) Date of Patent: Oct. 22, 2024

(54) CHANNEL ACCESS PRIORITY CLASS FOR SIGNALING RADIO BEARERS IN NEW RADIO UNLICENSED

(71) Applicant: MediaTek Singapore Pte. Ltd., Singapore (SG)

(72) Inventors: Abhishek Roy, San Jose, CA (US); Pavan Santhana Krishna Nuggehalli, San Jose, CA (US); Chia-Chun Hsu, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 438 days.

(21) Appl. No.: 17/430,584

(22) PCT Filed: Feb. 12, 2020

(86) PCT No.: PCT/US2020/017824
§ 371 (c)(1),
(2) Date: Aug. 12, 2021

(87) PCT Pub. No.: WO2020/167880
PCT Pub. Date: Aug. 20, 2020

(65) Prior Publication Data
US 2022/0132573 A1    Apr. 28, 2022

Related U.S. Application Data

(60) Provisional application No. 62/804,813, filed on Feb. 13, 2019.

(51) Int. Cl.
*H04W 74/0816* (2024.01)
*H04W 72/23* (2023.01)
(Continued)

(52) U.S. Cl.
CPC ....... *H04W 74/0816* (2013.01); *H04W 72/23* (2023.01); *H04W 72/569* (2023.01); *H04W 74/0866* (2013.01)

(58) Field of Classification Search
None
See application file for complete search history.

(56) References Cited

U.S. PATENT DOCUMENTS 10,045,376 B2   8/2018   Yang et al.
11,382,097 B2   7/2022   Hu et al.
(Continued)

FOREIGN PATENT DOCUMENTS

CN    107294577 A    10/2017
CN    107852746 A    3/2018
(Continued)

OTHER PUBLICATIONS

International Search Report and Written Opinion dated May 26, 2020, issued in application No. PCT/US2020/017824.
(Continued)

*Primary Examiner* — Mariela Vidal Carpio
(74) *Attorney, Agent, or Firm* — McClure, Qualey & Rodack, LLP

(57) ABSTRACT

A method for determining Listen Before Talk (LBT) type and Channel Access Priority Class (CAPC) for signaling message transmission over signaling radio bearers (SRBs) in 5G New Radio-Unlicensed (NR-U) is proposed. A user equipment (UE) generates an SRB message to be transmitted to a serving base station over a control channel. Before the uplink (UL) transmission of an UL PDU containing the SRB message, the UE performs an LBT procedure using a set of LBT parameters associated with a CAPC value. In one embodiment, the CAPC is provided by the base station via an UL grant contained in a downlink control information
(Continued)

(DCI). In another embodiment, the CAPC is determined by the UE based on an SRB type of the SRB message.

14 Claims, 3 Drawing Sheets

(51) Int. Cl.
*H04W 72/566* (2023.01)
*H04W 74/08* (2024.01)

(56) References Cited

U.S. PATENT DOCUMENTS

| | | |
|---|---|---|
| 2015/0312957 A1 | 10/2015 | Pelletier et al. |
| 2017/0238342 A1 | 8/2017 | Yang et al. |
| 2017/0318595 A1 | 11/2017 | Dinan |
| 2017/0359808 A1 | 12/2017 | Dinan |
| 2018/0255578 A1 | 9/2018 | Kim et al. |
| 2019/0021126 A1* | 1/2019 | Chun .................... H04W 76/22 |
| 2019/0053273 A1* | 2/2019 | Kim .................. H04W 74/0866 |
| 2020/0059969 A1* | 2/2020 | Agiwal ................. H04W 72/23 |
| 2020/0092779 A1* | 3/2020 | Jung .................... H04W 36/14 |
| 2020/0205195 A1* | 6/2020 | Sun ................... H04W 74/0808 |
| 2020/0314895 A1* | 10/2020 | Bergström ........ H04W 28/0268 |
| 2021/0007146 A1* | 1/2021 | Agiwal ............. H04W 74/0833 |
| 2021/0029777 A1* | 1/2021 | Lv .......................... H04W 80/02 |
| 2021/0235512 A1* | 7/2021 | Lee ....................... H04W 48/02 |
| 2022/0086908 A1* | 3/2022 | Myung ............. H04W 74/0816 |
| 2022/0201753 A1* | 6/2022 | Zhang ............... H04W 74/0875 |
| 2023/0051403 A1* | 2/2023 | Kumagai ............ H04L 27/2666 |
| 2023/0164871 A1* | 5/2023 | Jung ................. H04W 12/0433 370/328 |

FOREIGN PATENT DOCUMENTS

| | | |
|---|---|---|
| CN | 108781465 A | 11/2018 |
| WO | 2017/014716 A1 | 1/2017 |

OTHER PUBLICATIONS

Chinese language office action dated Jan. 27, 2021, issued in application No. TW 109104477.
Chinese language office action dated Dec. 4, 2023, issued in application No. CN 202080006832.8.
VIVO; "CAPC Restriction to SRB Multiplexing Using CG;" 3GPP TSG-RAN WG2 Meeting #108; Nov. 2019; pp. 1-5.

* cited by examiner

CHANNEL ACCESS PRIORITY CLASS FOR SIGNALING RADIO BEARERS IN NEW RADIO UNLICENSED

CROSS REFERENCE TO RELATED APPLICATIONS

This application claims priority under 35 U.S.C. § 119 from U.S. Provisional Application No. 62/804,813, entitled "CAPC for Signaling Radio Bearers (SRB) in NR-U," filed on Feb. 13, 2019, the subject matter of which is incorporated herein by reference.

TECHNICAL FIELD

The disclosed embodiments relate generally to wireless network communications, and, more particularly, to determining Channel Access Priority Class (CAPC) for Signaling Radio Bearers (SRB) in new radio unlicensed (NR-U) wireless communications systems.

BACKGROUND

Third generation partnership project (3GPP) and 5G New Radio (NR) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand. One suggested solution is to use NR over unlicensed spectrum. This solution is referred to as NR-Unlicensed (NR-U). In such a solution, an established communication protocol, such as a 5G carrier can be used entirely over unlicensed spectrum to provide communication links.

In 3GPP NR, 5G terrestrial New Radio (NR) access network (includes a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH.

Listen-Before-Talk (LBT) is a technique used in radio communications, whereby radio transmitters first sense its radio environment (channel) before it starts any transmission. LBT can be used by a radio device to find a channel the device is allowed to operate on or to find a free radio channel to operate on. In New Radio-Unlicensed (NR-U), any downlink and uplink access have to follow the LBT channel access procedure, as unlicensed frequencies are also used by other networks such as WiFi. 3GPP has classified different LBT schemes according to four different LBT categories.

The selection of LBT categories goes hand-in-hand with determining a suitable Channel Access Priority Class (CAPC). While there have been recent proposals for LBT and CAPC for user plane (UL and DL) data transmission, LBT and CAPC for control channels also need to be discussed and resolved. 3GPP has introduced four different channel access priority classes. Naturally, selecting the proper LBT type and determining a suitable CAPC is very important for transmission and reception of control messages in NR-U. Note that LBT category needs to be selected in such a way that it provides fairness with other unlicensed networks such as WiFi. Similarly, CAPC should be determined depending on the priority of the message, so that higher priority messages are assigned with higher priority CAPC (lower CAPC values).

Signaling Radio Bearers (SRBs) are used to transfer radio resource control (RRC) and non-access stratum (NAS) layer signaling messages. SRB types in NR include SRB0, SRB1, SRB2 and SRB3 defined for different messages to be transmitted over different channels. In NR-U, UE needs to perform LBT even for all SRBs. Note that, this is quite different from existing LTE-LAA, as in LTE-LAA SRBs are transmitted over the licensed carrier and need no LBT or CAPC. As LBT Category 4 is selected as the default LBT, an NR-U UE also needs to assign a CAPC for these SRBs in 5G NR-U wireless communication networks.

SUMMARY

A method for determining Listen Before Talk (LBT) type and Channel Access Priority Class (CAPC) for signaling message transmission over signaling radio bearers (SRBs) in 5G New Radio-Unlicensed (NR-U) is proposed. A user equipment (UE) generates an SRB message to be transmitted to a serving base station over a control channel. Before the uplink (UL) transmission of an UL PDU containing the SRB message, the UE performs an LBT procedure using a set of LBT parameters associated with a CAPC value. In one embodiment, the CAPC is provided by the base station via an uplink grant contained in a downlink control information (DCI). In another embodiment, the CAPC is determined by the UE based on an SRB type of the SRB message. In yet another embodiment, the uplink PDU is formed by multiplexing of multiple SRBs and DRBs, and the UE is given the responsibility of the UL CAPC assignment based on the UL PDU information.

In one embodiment, a UE establishes a connection with a base station over an unlicensed band. The connection comprises one or more signaling radio bearers (SRBs). The UE generates an SRB message to be transmitted to the base station over a control channel. The UE performs a listen-before-talk (LBT) procedure using a set of LBT parameters associated with a channel access priority class (CAPC). The UE obtains the CAPC corresponds to the SRB message. The UE then transmits the SRB message over the control channel upon successfully completing the LBT procedure.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
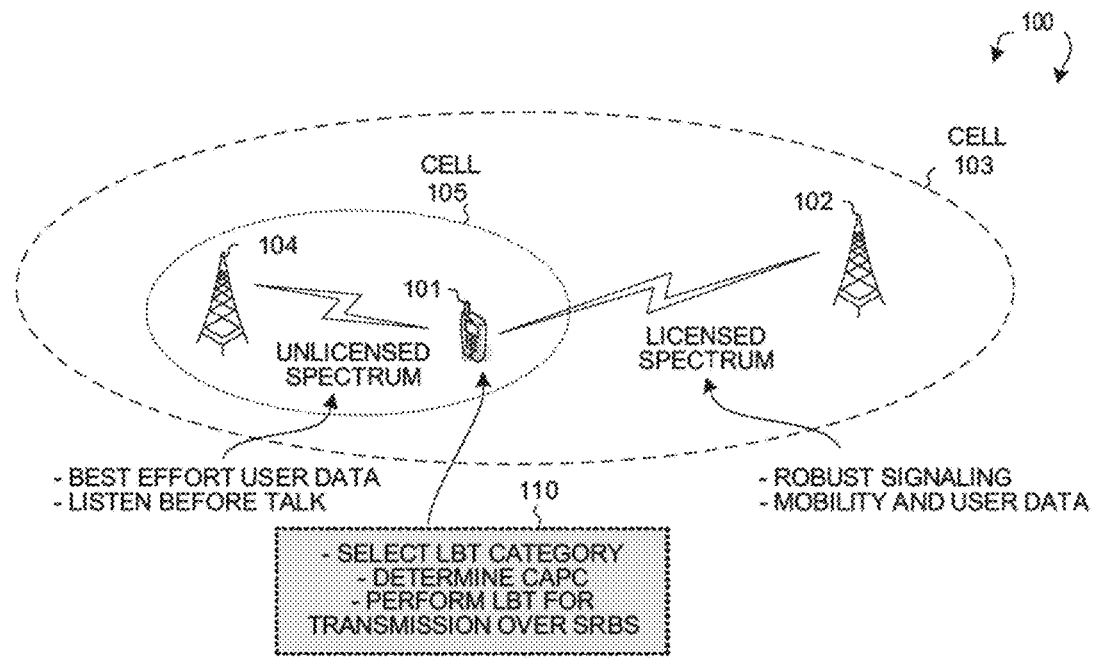
FIG. 1 illustrates an exemplary 5G new radio NR-Unlicensed (NR-U) wireless communications system that adopts Listen Before Talk (LBT) channel access mechanism for signaling radio bearer (SRB) transmission in accordance with one novel aspect.

FIG. 1 illustrates an exemplary 5G new radio NR-Unlicensed (NR-U) wireless communications system that adopts Listen Before Talk (LBT) channel access mechanism for signaling radio bearer (SRB) transmission in accordance with one novel aspect. NR-U wireless communications system 100 includes one or more wireless communication networks, and each of the wireless communication networks has one or more base infrastructure units, such as 102 and 104. The base infrastructure units may also be referred to as an access point, an access terminal, a base station, an eNB, a gNB, or by other terminology used in the art. Each of the wireless communication base stations 102 and 104 serves a geographic area. The geographic area served by wireless communications base stations 102 and 104 overlaps in the example of FIG. 1.

Base station 102 is a licensed base station that communicates with UE 101 via a licensed frequency band. In one example, base station 102 communicates with UE 101 via 5G NR wireless communication. Base station 102 provides wireless communication to multiple UEs within cell 103. Base station 104 is an unlicensed base station that communicates with UE 101 via an unlicensed frequency band. In one example, base station 104 communicates with UE 101 via 5G NR wireless communication. Base station 104 can communicate with multiple UEs with cell 105. Note that, FIG. 1 is an illustrative plot. The base station 102 and base station 104 can be co-located geographically. Also note the NR-U can operate as both licensed cell and unlicensed cell, and as both primary cell as well as secondary cell.

The exponential growth in data consumption has created large bandwidth demands that cannot be met by current wireless systems. To meet this ever-increasing demand for data, new wireless systems with greater available bandwidth are needed. New Radio-Unlicensed (NR-U) wireless networks can be used to provide greater available bandwidth. An NR-U network utilizes unlicensed frequency bands in addition to licensed frequency bands contemporaneously, thereby provided additional available bandwidth to the UEs in the wireless system. For example, UE 101 can benefit from simultaneous use of the licensed frequency band and the unlicensed frequency band in an NR-U network. The NR-U network not only provides additional bandwidth for greater overall data communication, but also provide consistent data connectivity due to the presence of two separate data links. Having multiple data links available increases the probability that the UE will be able to achieve proper data communication with at least one base station at any given moment.

Signaling Radio Bearers (SRBs) are used to transfer radio resource control (RRC) and non-access stratum (NAS) layer signaling messages. SRB types in NR include SRB0, SRB1, SRB2 and SRB3 defined for different signaling messages to be transmitted over different channels. In NR-Unlicensed (NR-U), not only data channel, but also control channels are transmitted over the 5 GHz unlicensed band. As a result, in NR-U, the different SRBs for the RRC and NAS signaling messages are also transmitted over the 5 GHz unlicensed band. While utilization of the unlicensed spectrum provides more available bandwidth, the use of the unlicensed spectrum faces practical problems that need to be addressed.

To facilitate efficient and fair spectrum sharing, a dynamic spectrum sharing mechanism called listen-before-talk (LBT) channel access procedure needs to be followed for all downlink and uplink transmission in NR-U, as unlicensed frequencies are also used by other networks such as WiFi. Therefore, in NR-U, UE needs to perform LBT for SRB signaling message transmission over all control channels. Note that, this is quite different from existing LTE-LAA, as in LTE-LAA SRBs are transmitted over the licensed carrier and need no LBT. 3GPP has classified different LBT schemes according to four different LBT categories. The selection of LBT categories goes hand-in-hand with determining a suitable Channel Access Priority Class (CAPC). 3GPP has introduced four different channel access priority classes for LTE LAA and NR-U. Naturally, selecting the proper LBT type and determining a suitable CAPC is very important for transmission and reception of signaling messages in NR-U.

As LBT Category 4 is selected as the default LBT for SRB transmission, an NR-U UE also needs to assign a CAPC for these SRBs. Hence, different SRBs need to be explored for an efficient assignment of CAPC. In accordance with one novel aspect, a method is provided for UE to assign suitable CAPC for SRBs in NR-U wireless communication network. In the example of FIG. 1, UE 101 is connected with gNB 104 over unlicensed band, and UE 101 needs to transmit an SRB signaling messages to gNB 104. As depicted by 110, UE first selects a suitable LBT category and then determines an efficient CAPC for the SRB signaling message transmission over a corresponding control channel based on the signaling message size and content. UE 101 then performs an LBT procedure under the selected LBT category using a set of LBT parameters associated with the determined CAPC value. Upon successfully completing the LBT procedure, UE 101 then transmits the SRB signaling message to gNB 104.

Figure 2:
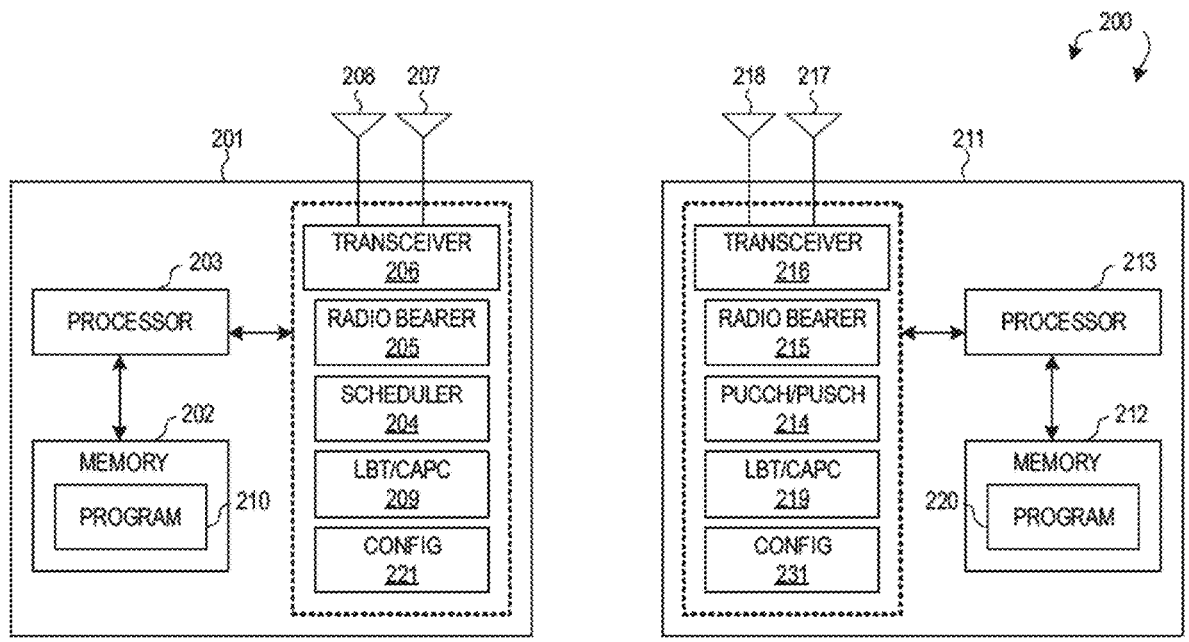
FIG. 2 is a simplified block diagram of a wireless transmitting device and a receiving device in accordance with embodiments of the present invention.

FIG. 2 is a simplified block diagram of wireless devices 201 and 211 in accordance with embodiments of the present invention. For wireless device 201 (e.g., a transmitting device), antennae 207 and 208 transmit and receive radio signal. RF transceiver 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a base station that includes a radio bearer handling circuit 205, a scheduler 204, an LBT/CAPC channel access circuit 209, and a configuration circuit 221. Wireless device 211 is a UE that includes a radio bearer handling module 215, a PUCCH/PUSCH handling module 214, an LBT/CAPC channel access circuit 219, and a configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, the base station 201 establishes one or more signaling and data radio bearers with the UE 211 via radio bearer handing circuit 205, schedules downlink and uplink transmission for UEs via scheduler 204, performs downlink LBT procedure and determines CAPC via channel access circuit 209, and provides configuration information to UEs via configuration circuit 221. The UE 211 establishes one or more signaling and data radio bearers with the base station via radio bearer handing circuit 215, generates uplink signaling and data messages to be transmitted over PUCCH and PUSCH via PUCCH/PUSCH module 214, performs uplink LBT procedure and determines CAPC via channel access circuit 219, and obtains configuration information via configuration circuit 231. In accordance with one novel aspect, UE 211 determines the LBT categories and CAPC levels based on the SRB/DRB messages to be transmitted over PUCCH/PUSCH.

Figures 3, 4:
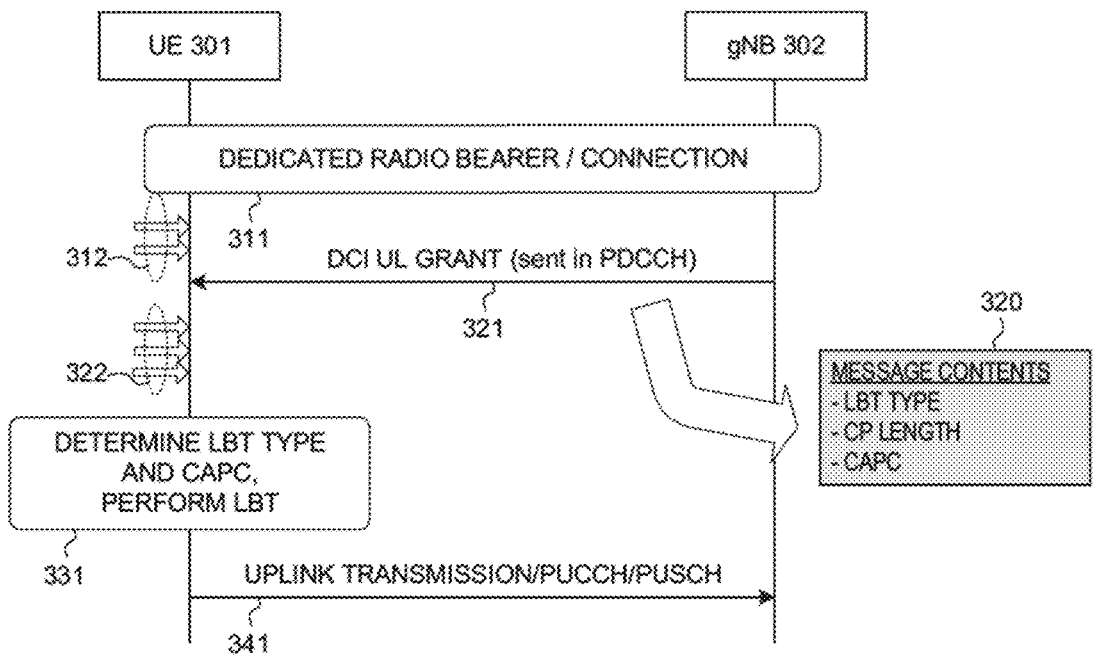
FIG. 3 illustrates a sequence flow between a UE and a base station for SRB transmission using a Listen Before Talk (LBT) type and a Channel Access Priority Class (CAPC) value in 5G NR-U in accordance with one novel aspect.
FIG. 4 illustrates examples of different SRB signaling messages associated with CAPC value for SRB transmission in 5G NR-U.

FIG. 3 illustrates a sequence flow between a UE and a base station for SRB transmission using a Listen Before Talk (LBT) type and a Channel Access Priority Class (CAPC) value in 5G NR-U in accordance with one novel aspect. In step 311, UE 301 and gNB 302 establish a dedicated connection with each other. For example, the dedicated connection is a signaling radio bearer (SRB) or a data radio bearer (DRB). Different SRBs include SRB0, SRB1, SRB1, and SRB2 defined for different radio resource control (RRC) and non-access stratum (NAS) signaling messages. In step 312, UE 301 generates one or more SRB signaling messages to be sent to gNB 302. In step 321, gNB 302 transmits a downlink control information (DCI) over a physical downlink control channel (PDCCH). The DCI carries uplink grants of radio resources to be used for UE uplink transmission. In one example, the DCI may also carry additional configuration information for LBT parameters including LBT type, length of CP extension, and CAPC value. In step 322, UE 301 may have subsequent SRB and/or DRB messages to be transmitted uplink. In step 331, UE 301 determines LBT type and appropriate CAPC and then performs LBT procedure accordingly. In step 341, upon successful LBT procedure, UE 301 transmits an UL PDU of the SRB/DRB messages over physical uplink control channel or physical uplink shared channel (PUCCH/PUSCH).

When performing LBT procedure, LBT category needs to be selected in such a way that it provides fairness with other unlicensed networks such as WiFi. Therefore, UE may select Category 4 LBT as the default LBT type for all SRB transmissions as Category 4 LBT offers fairness with other unlicensed network nodes. For Category 4 (LBT with random backoff with a contention window of variable size), the transmitting entity draws a random number N within a contention window. The size of the contention window is specified by the minimum and maximum value of N. The transmitting entity can vary the size of the contention window when drawing the random number N. The random number N is used in the LBT procedure to determine the duration of time that the channel is sensed to be idle before the transmitting entity transmits on the channel. Note that Category 4 LBT takes longer time and has lower success rate as compared to other LBT procedures.

The selection of LBT categories goes hand-in-hand with determining a suitable CAPC, because Category 4 LBT requires determination of CAPC. 3GPP has introduced four different channel access priority classes for LTE LAA and NR-U. Table 1 below shows the different priority classes, where the smaller the number of the class, the higher the priority. Each priority class uses different $T_{mcot,p}$, which refers to the maximum channel occupancy time for priority class p. For the priority Classes 3 and 4, $T_{mcot,p}$ is 10 ms, if the absence of any other co-located technology sharing the same spectrum band can be guaranteed on a long-term basis. In a different case, it is limited to 8 ms. According to the 3GPP standards, a device cannot continuously transmit in the unlicensed spectrum for a period longer than $T_{mcot,p}$.

TABLE 1

Different CAPC Defined in 3GPP Standards

| CAPC | $m_p$ | $CW_{min, p}$ | $CW_{max, p}$ | $T_{MCOT, p}$ | Allowed CWp sizes |
|---|---|---|---|---|---|
| 1 | 1 | 3 | 7 | 2 ms | 3, 7 |
| 2 | 1 | 7 | 15 | 3 ms | 7, 15 |
| 3 | 3 | 15 | 63 | 8 or 10 ms | 15, 31, 63 |
| 4 | 7 | 15 | 1023 | 8 or 10 ms | 15, 31, 63, 127, 255, 511, 1023 |

CAPC—channel access priority class
$m_p$—maximum number of transmission attempts for priority class p
$CW_{min, p}$—minimal contention window size for priority class p
$CW_{max, p}$—maximum contention window size for priority class p
$T_{MCOT, p}$—maximum channel occupancy time for priority class p Where When Category 4 LBT is performed for UL PDU transmission, UE 301 needs to determine a suitable CAPC for corresponding SRB transmission, where lower CAPC values reflect higher priority. In general, CAPC should be determined depending on the priority of the message, so that higher priority messages are assigned with higher priority CAPC (lower CAPC values). In one embodiment, CAPC is provided by gNB 302 via the uplink grant carried by DCI over PDCCH for the SRB transmission (e.g., in step 321). In another embodiment, CAPC is determined by UE 301 based on the up-to-date details of the UL PDU information (e.g., in step 331).

FIG. 4 illustrates examples of different SRB signaling messages associated with CAPC value for SRB transmission in 5G NR-U. Different SRBs are defined for different RRC and NAS signaling messages, therefore, the different SRBs need to be explored for an efficient assignment of CAPC. As depicted in Table 410, SRB0 is transmitted using transparent mode (TM) over a common control channel (CCCH), e.g., via a physical uplink control channel (PUCCH), and is generally used for UEs having not yet established an RRC Connection. Hence, it seems logical to provide the most stringent CAPC (value=1, higher priority) to SRB0. SRB1 is transmitted using acknowledged mode (AM) over a dedicated control channel (DCCH), e.g., via a physical uplink shared channel (PUSCH). SRB1 carries important signaling information, e.g. RRC Connection Reconfiguration, Security Mode and Mobility (handover) messages. Hence, SRB1 should also be provided with the most stringent CAPC (value=1). SRB2 is transmitted using AM over a DCCH via PUSCH. SRB2, on the other hand, carries relatively less time-critical NAS signaling messages. Hence, SRB2 could be provided with less stringent CAPC (value=2, lower priority). SRB3 is transmitted using AM over a DCCH via PUSCH, and is used primarily for MR, measurement configuration, reporting, MAC, RLC, PHY reconfiguration and RLF timers and constants of SCG (in ENDC). Hence, SRB3 could also be provided with the most stringent (value=1) CAPC with higher priority. In one example, RRC configurations can include the above CAPC assignments.

For uplink (UL) transmission, UE will be generating protocol data units (PDUs) formed by multiplexing of SRBs and DRBs. Naturally, gNB can explicitly assign the CAPC of the PDUs. However, it seems to be quite overhead and burdensome for the gNB, as gNB needs to check all logical channels across all UEs for the CAPC assignment. Moreover, gNB might not have complete and up-to-date information about UL PDUs across all the UEs. Therefore, UE can be given the responsibility of UL CAPC assignment, as UE knows the up-to-date information and details of UL PDUs. In one embodiment, UE can select the highest priority (most stringent, lowest value) CAPC across all the radio bearers as the CAPC of the multiplexed PDU for all radio bearers forming the UL PDU. This will enable faster transmission of high priority SRBs (SRB0, SRB1) or dedicated, real-time DRBs, having high LCPs, multiplexed with lower priority SRB2. However, it will be different from existing mechanisms in LAA and unfair to WiFi services.

Alternatively, UE can select the lowest priority (least stringent, highest value) CAPC across all the radio bearers as the CAPC of the multiplexed PDU for all radio bearers forming the UL PDU. This will be similar to existing LTE LAA AUL principles and provide fairness to WiFi nodes, but can affect transmission of high priority SRBs and/or reduce QoS of real-time DRBs.

Referring back to FIG. 3, in step 312, UE 301 has one or more SRBs for uplink transmission before receiving the UL grant. In step 322, UE 301 continue to have SRBs and/or DRBs for uplink transmission after receiving the UL grant. The UL PDU is formed by multiplexing the different SRBs and DRBs, and UE 301 has the most up-to-date information about the UL PDU. Therefore, UE can be given the responsibility of UL CAPC assignment every time UE performs LBT, as UE knows the up-to-date details of UL PDUs. In one example, UE 301 selects the highest priority CAPC across all radio bearers as the CAPC of the multiplexed UL PDUs. The Transport Block (TB) formed by multiplexing these logical channels (LCHs) will have the highest priority (lowest index) CAPC. This could be made conditionally only for SRB1 and SRB3, i.e. if at least one of the LCHs contain SRB0, SRB1 or SRB3, the UL TB will be formed by using highest priority CAPC across all LCHs. In another example, UE 301 selects the lowest priority CAPC across all radio bearers as the CAPC of the multiplexed UL PDUs. This will make the design similar and backward compatible with LTE-LAA AUL principles, but can affect the transmission of high priority SRBs or dedicated real-time DRBs, multiplexed with low priority SRB2. This could be made conditionally only for DRBs and SRB2, in the absence of SRB1 and/or SRB3, i.e. if none of the LCHs contain SRB1 and/or SRB3, the UL TB will be formed by using the lowest priority CAPC across all LCHs.

Note that, every CAPC value for an LBT procedure is associated with a specific maximum channel occupancy time (MCOT). MCOT is the maximum continuous transmission time after channel sensing. Different CAPC may have different MCOT. Therefore, UE needs to ensure that the MCOT limits for each CAPC are met for each UL PDU transmission. If gNB provides the CAPC value with UL grants, then UE will be using the CAPC value associated with the UL grants. UE can ensure the MCOT limits by executing LBT again if necessary. Once UE has decided to transmit an UL PDU, if MCOT limits have not been reached and the UL grant is long enough, then UE simply transmits the UL PDU without performing LBT in the consecutive slot and re-use the existing CAPC value. Otherwise, if MCOT limits have been reached, then UE performs LBT and assigns CAPC again before transmitting the UL PDU to the base station.

Figure 5:
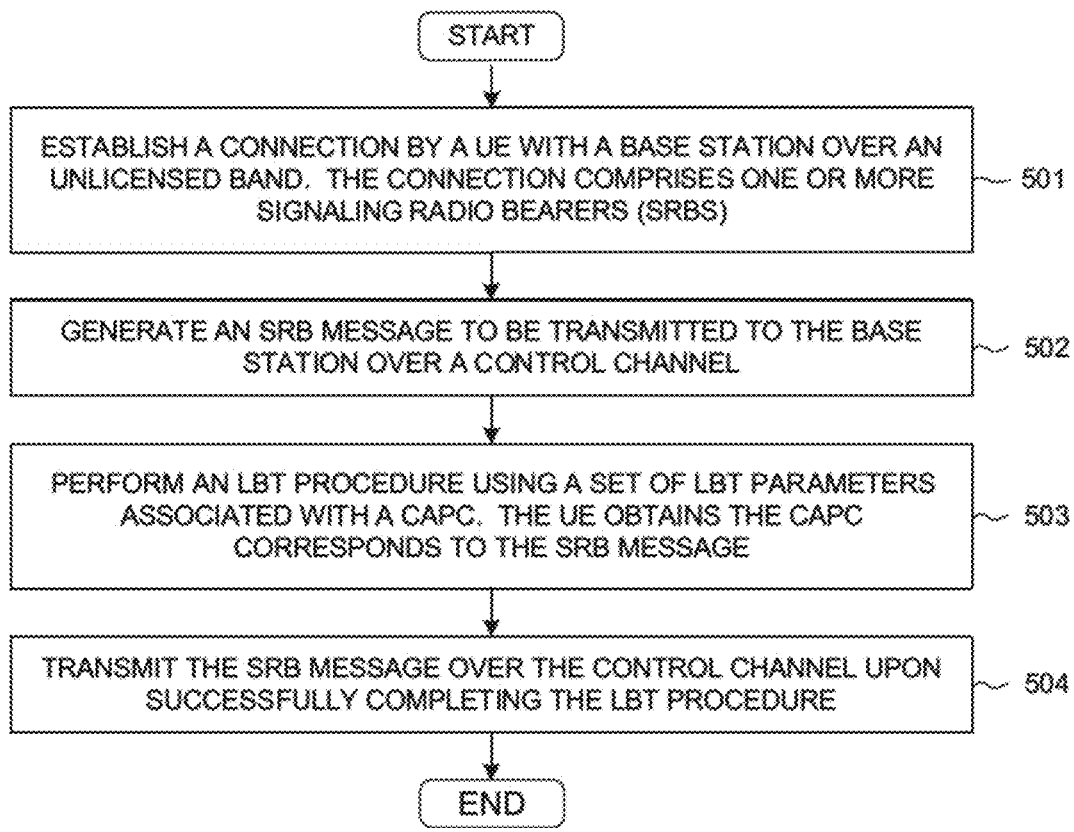
FIG. 5 is flow chart of a method of UE determining LBT categories and suitable Channel Access Priority Class (CAPC) values for SRB transmission in 5G NR-U in accordance with one novel aspect.

FIG. 5 is flow chart of a method of UE determining LBT categories and suitable Channel Access Priority Class (CAPC) values for SRBs transmission in 5G NR-U in accordance with one novel aspect. In step 501, a UE establishes a connection with a base station over an unlicensed band, wherein the connection comprises one or more signaling radio bearers (SRBs). In step 502, the UE generates an SRB message to be transmitted to the base station over a control channel. In step 503, the UE performs a listen-before-talk (LBT) procedure using a set of LBT parameters associated with a channel access priority class (CAPC). The UE obtains the CAPC corresponds to the SRB message. In step 504, the UE transmits the SRB message over the control channel upon successfully completing the LBT procedure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    establishing a connection by a user equipment (UE) with a base station over an unlicensed band, wherein the connection comprises one or more signaling radio bearers (SRBs);
    generating an SRB message; wherein the SRB message is transmitted to the base station over a control channel;
    performing a listen-before-talk (LBT) procedure using a set of LBT parameters associated with a channel access priority class (CAPC), wherein the UE obtains the CAPC corresponds to the SRB message; wherein the set of LBT parameters comprises LBT type, length of cyclic prefix (CP) extension, and CAPC value; and
    transmitting the SRB message over the control channel upon successfully completing the LBT procedure;

wherein the UE multiplexes the SRB message and subsequent messages to be transmitted in one uplink protocol data unit (PDU).

2. The method of claim 1, wherein the CAPC is obtained from an uplink grant for the SRB message provided by the base station.

3. The method of claim 1, wherein the CAPC is assigned by the UE based on an SRB type of the SRB message.

4. The method of claim 1, wherein the SRB message belongs to one of SRB types including SRB0, SRB1, SRB2, and SRB3 type.

5. The method of claim 4, wherein a higher CAPC priority value is assigned to SRB messages having SRB0, SRB1, or SRB3 type.

6. The method of claim 4, wherein a lower CAPC priority value is assigned to SRB messages having SRB2 type.

7. The method of claim 1, wherein the UE selects a highest priority across all multiplexed messages to perform the LBT procedure.

8. The method of claim 1, wherein the UE selects a lowest priority across all multiplexed messages to perform the LBT procedure.

9. The method of claim 1, wherein the UE performs another LBT procedure for a subsequent uplink transmission after reaching a maximum channel occupancy time (MCOT).

10. A User Equipment (UE), comprising:
a radio bearer handling circuit that establishes a connection with a base station over an unlicensed band, wherein the connection comprises one or more signaling radio bearers (SRBs);
an uplink channel handling circuit that generates an SRB message; wherein the SRB message is transmitted to the base station over a control channel;
a listen-before-talk (LBT) handling circuit that performs an LBT procedure using a set of LBT parameters associated with a channel access priority class (CAPC), wherein the UE obtains the CAPC corresponds to the SRB message; wherein the set of LBT parameters comprises LBT type, length of cyclic prefix (CP) extension, and CAPC value; and
a transmitter that transmits the SRB message over the control channel upon successfully completing the LBT procedure;
wherein the UE multiplexes the SRB message and subsequent messages to be transmitted in one uplink protocol data unit (PDU).

11. The UE of claim 10, wherein the CAPC is obtained from an uplink grant for the SRB message provided by the base station.

12. The UE of claim 10, wherein the CAPC is assigned by the UE based on an SRB type of the SRB message.

13. The UE of claim 10, wherein the SRB message belongs to one of SRB types including SRB0, SRB1, SRB2, and SRB3 type.

14. The UE of claim 13, wherein a higher CAPC priority value is assigned to SRB messages having SRB0, SRB1, or SRB3 type.

* * * * *